Oct. 8, 1935.  C. W. RICE  2,016,907
SOUND WAVE APPARATUS
Filed June 6, 1934
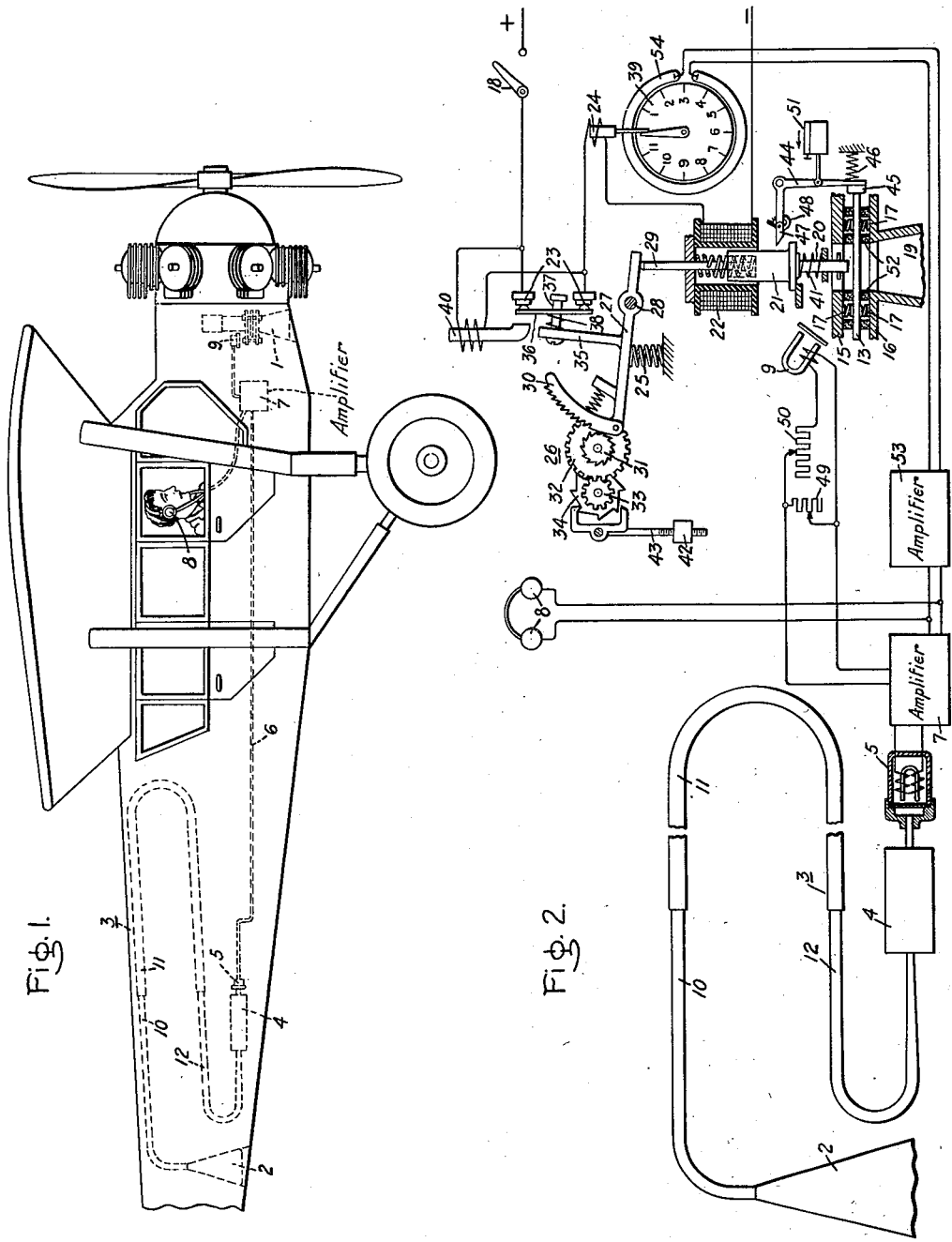
Inventor:
Chester W. Rice,
by Harry E. Dunham
His Attorney Patented Oct. 8, 1935

2,016,907

UNITED STATES PATENT OFFICE 2,016,907

SOUND WAVE APPARATUS

Chester W. Rice, Schenectady, N. Y., assignor to General Electric Company, a corporation of New York Application June 6, 1934, Serial No. 729,196

7 Claims. (Cl. 177—352)

My invention relates to sound wave apparatus and more particularly to such apparatus for indicating distances from a reflecting surface, as in indicating altitudes from aircraft. This application is a continuation in part of my application Serial No. 532,006, filed April 22, 1932, and entitled Sound wave apparatus.

My present invention has for one of its objects to provide a sonic altimeter capable of producing improved indications at low altitudes such as altitudes near those at which the operator of an aircraft executes his final operations in the landing of the craft.

In the operation of sonic altimeters such as that shown in my above application, and in my United States Patent No. 1,889,614, for example, sound wave impulses are transmitted from the craft to the earth, these impulses being received on the craft after reflection from the earth. The interval between the time of transmission of the impulse and reception thereof after reflection from the earth constitutes an indication of altitude.

In the operation of such apparatus each transmitted impulse, of course, has a certain definite duration. This means that at some altitude above the earth the echo of any impulse is received just at the termination of the transmitted impulse the two impulses blending into a single impulse in the receiving apparatus. This may occur, for example, at an altitude of five feet above the ground. It is at some altitude considerably higher than five feet, however, where the transmitted and received impulses are received with sufficient time interval between them to cause them to appear to the operator as two distinct impulses. It is desirable, in the interest of accurate determination of these low altitudes, that the transmitted impulse and its echo appear to the aircraft operator as distinct impulses until an altitude is reached at which the operator executes his final landing operation, that is, an altitude where the wheels of the craft, if it be a land plane, are within approximately two feet of, or rest upon, the earth.

Accordingly an object of my invention is to delay the indication of the received echo impulse to such an extent that it appears as a distinct impulse at the lowest altitudes to be measured.

A further object of the invention is to produce delay in the indication of the received echo impulse without producing equivalent delay in the indication of the transmitted impulse.

Still a further object of my invention is to provide means whereby the delay obtained is adjustable.

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawing in which Fig. 1 illustrates an aircraft equipped with my invention, and Fig. 2 shows in greater detail a sonic altimeter involving my invention.

Referring to Fig. 1 the aircraft illustrated therein is provided at 1 with a transmitter of sound wave impulses, and at 2 with a receiver of such impulses. The impulses received from the transmitter 1 of course travel toward the earth and are reflected by the earth, the echos thereof being received in the receiver 2. The receiver 2 is connected by means of an acoustic channel 3, sound wave filter 4, sound wave pick-up device 5 and electric circuit 6 to an amplifier 7 whereby the sound waves received in the receiver 2 are amplified and supplied to headphones 8 worn by the operator, or if preferred to a visual indicating device. The transmitter 1 is likewise provided with a sound wave pick-up device 9, which is arranged in close proximity to the transmitter to pick up sound waves transmitted thereby. The electrical output from this sound wave pick-up is supplied to the input of the amplifier 7 whereby these sound waves are likewise amplified and supplied to the headphones of the operator or to the alternative visual indicating device.

The acoustic channel 3 may comprise any suitable conduit preferably of about 1" in interior diameter, or larger, so that sound waves are transmitted freely through it. This channel is provided with telescoping members 10, 11, and 12 whereby the length of the channel is adjustable, the member 11 being indicated in the drawing as of a U-shape and telescoping at either end with the members 10 and 12 respectively. This conduit may of course be arranged within the fuselage of the craft and extend back and forth therein in any convenient manner. It is desirable, however, that the member 11 be adjustable at least at the time of initial installation of the equipment.

In the operation of the equipment the sound wave impulse is transmitted by the transmitter 1, this impulse being picked up by the pick-up device 9 and indicated to the operator by the headphones 8. Since the connections between the pick-up 9 and the headphones 8 are electrical substantially no time delay occurs in the transmission of the impulse to the headphones with the result that the transmitted impulse is indicated immediately to the operator. This impulse is received in the receiver 2 after reflection from the earth and is transmitted through the delay channel 3. The length of the delay channel 3, however, is so adjusted by positioning of the member 11 that the time required for the sound impulse to travel through the conduit is sufficient to cause this impulse to appear as a separate and distinct impulse at the lowest altitudes to be measured. That is, the operator hears two separate and distinct impulses for each transmitted impulse until an altitude is reached at which he executes his final operation in the landing of the craft. This altitude may be for example from one or two feet to zero. In fact, if desired, by suitable adjustment of member 11, the impulses may be made distinct even at zero altitude although I contemplate that at zero altitude the two impulses will appear to blend into a single impulse.

In Fig. 2 I have shown in greater detail the equipment which I prefer to employ in connection with my invention. The transmitter comprises a tuned diaphragm 13 which may comprise, for example, a disk of suitable metal, such as duraluminum, which has a natural frequency suitable for the purposes of my invention. This frequency may, for example, be any frequency within the range of from 2,000 cycles to 4,000 cycles although I contemplate the use of a frequency of about 3,000 cycles.

This disk is supported between two rigid members 15 and 16 by means of coil springs 17 arranged about the nodal ring of the disk on either side thereof. The sound waves generated by the lower surface of the disk within the nodal ring are transmitted through the somewhat abbreviated megaphone 19 toward the earth.

The disk 13 is set into vibration by means of a hammer 20 driven by the armature 21 of an electromagnet 22. This electromagnet is arranged to be energized through a circuit extending from the positive side of the source of electromotive force through switches 18 and 23 and magnet 24 to the negative side of the source of electromotive force. The armature 21 is held downward by a coil spring arranged within the coil 22, and also by means of a coil spring 25 forming a part of an escapement mechanism 26 which serves a purpose later to be described.

This escapement mechanism is provided with a lever 27 pivoted at a point 28 intermediate its length, the right arm of the lever 27 bearing downward upon a projection 29 from the armature 21. The left arm of the lever 27 is provided with a rack 30 which cooperates with a ratchet wheel 31 which is attached to gear 32, which, in turn, is attached to a gear 33 mounted upon the escapement wheel 34. The left-hand arm of the lever 27 is also provided with an upwardly projecting arm 35 which carries contacts of the switch 23, these contacts being mounted on a bridge member 36, which is loosely secured to the arm 35 by means of a bolt 37. The bridge member 36 when in the position shown in the drawing is pressed against the stationary contacts of the switch by means of a coil spring 38 about the bolt 37.

The switch 23 is provided with a holding magnet 40 whereby it is held open in a manner later to be described, this magnet being connected so that it is short-circuited by the contacts of the switch.

Energization of the magnet 24 operates to release a timing device 39 which enables the operator, by observing the position of the index pointer when the echo is received, more accurately to determine the interval between transmitted and received impulses and hence the altitude.

The electric pick-up device 9 is mounted in any convenient position in proximity to the transmitter where it picks up sufficient energy to produce an indication of the transmitted impulse of desired intensity in the headphones. This pick-up is shown in the form of a magnetophone having a magnet coil in which oscillations are set up when sound waves fall upon a diaphragm in the flux path of the magnet. This coil is connected to the input of the amplifier 7 through a circuit including variable shunt resistor 49 and series resistor 50. By means of these resistors the intensity of the sound impulse produced in the receiver 8 in response to pick-up 9 may be made greater at all altitudes than the received echo impulse thereby to produce upon the ear of the operator the impression of a natural sound and echo.

The operation of the apparatus as thus described is as follows: The switch 18 is closed thereby energizing the magnets 24 and 22, the magnet 24 releasing the timer and the magnet 22 operating the armature 21 upward. In so doing the hammer 20 is likewise actuated upward by a spring 41 arranged about it. In moving upward the armature 21 rocks the lever 27 about the pivot 28 against the bias of spring 25. The switch 23 however is held closed by reason of spring 38 pressing upon the contact carrying bridge member 36 until the armature 21 approaches its uppermost position. When this occurs the head at the right end of bolt 37 causes the switch to be opened whereupon holding coil 40 becomes energized and magnetically grasps the bridge member 36, which may be of magnetic material, and holds it in its open position. The opening of the switch, however, causes coil 22 to be deenergized whereupon the armature 21 hits upon the hammer 20 causing it to strike against the diaphragm 13 with great force and thence to bounce backward to the position shown where it is held under influence of the spring 41.

The return of the member 27 to the position shown in the drawing is delayed by the action of the escapement mechanism 26. This escapement mechanism, however, permits the slow release of the member 27 with the result that pressure is gradually applied to the spring 38 until the bridge member 36 is released from the holding coil 40 at which time the switch snaps closed. The operation of the device is then repeated, this cycle of operation continuing once for each transmitted impulse.

The rate of transmission of impulses is thus determined by the rate at which the escapement 26 releases the lever 27. This may be determined by adjustment of the rate of release of the escapement, as by adjustment of the weight 42 upon the pendulum 43.

The duration of each impulse is of course determined by the natural decrement of the diaphragm, but if desired means may be provided whereby the diaphragm is automatically damped after each successive blow of the hammer. Such means are shown in the drawing and comprise the bellcrank lever 44, the lower end of which is provided with a rubber cushion 45 which is forced against the edge of the diaphragm by means of a spring 46. The left arm of the bellcrank lever is provided with a trigger 47 which is pivoted thereto to swing upwardly but which is prevented from swinging downwardly by means of a tongue 48 which engages the lower surface of a bellcrank lever upon any downward movement of the trigger. This trigger is biased to the position shown in any desired way. The left end of the trigger is arranged within the path of movement of the armature 21 so that when the armature 21 moves upwardly the trigger rotates upwardly and allows the armature to pass. Upon downward movement of the armature the trigger is engaged and causes the lever 44 to be rotated in a counterclockwise direction, thereby removing the cushion 45 from the diaphragm and allowing the diaphragm to oscillate freely after being struck by the hammer. The return of the cushion 45 against the diaphragm may be delayed in any suitable manner as conventionally indicated by the adjustable dashpot 51.

It has been found that a transmitter of the type described is especially desirable for use on aircraft since it is not excessive in weight, avoids the use of any gas or air supply such as is necessary if a whistle be employed, and in addition a clear tone of the desired frequency and of sufficient volume is produced by the diaphragm. The volume of sound produced by the diaphragm is increased by the use of the annular bushings or washers 52 arranged on either side of the row of springs 17 and in proximity to the nodal ring of the disk. These annular rings prevent air waves set up by the lower surface of the central portion of the diaphragm from communicating with those set up by the portion of the diaphragm projecting beyond the nodal ring. In this way the transmitted waves are not weakened by opposed waves produced by the outer portions of the diaphragm which oscillate in opposed phase relation to the central portion of the diaphragm.

It is believed that sufficient description has already been given with respect to the receiving apparatus, the receiver 2 and filter 4 being similar to that shown in my prior above-mentioned patent, and the interconnecting channel being designed for adjustable time delay as previously described. The filter 4, of course, prevents the transmission to the ear of the operator of sound waves having the frequency of the principal sounds produced about the craft. The sound wave pick-up device 5 may comprise a magnetophone having a magnet in which electrical oscillations are produced by reason of vibration of a diaphragm against which the sound waves from the filter impinge.

I have also shown in Fig. 2 visual means for indicating the altitude, this means comprising the additional amplifier 53 and lamp 54. The amplifier 53 has its input connected to the output of the amplifier 7, thereby additionally to amplify the received impulses and to supply them to the lamp 54 to cause the lamp to light. This lamp may be arranged in a great variety of ways with respect to the dial of the timer, either in front of it, in back of it, if the dial be translucent, or otherwise near it to illuminate the dial only upon transmission and reception of sound wave impulses. The lamp, of course, must be one the action of which in lighting is sufficiently rapid as not to introduce objectionable error in the indication. As shown in the drawing the lamp is a tubular one which may be arranged about the periphery of the dial. Such a lamp may be of the neon type, for example, which is caused to glow when potential greater than a certain value is applied between electrodes in the lamp.

As thus employed the lamp will produce two light flashes for each transmitted impulse. Upon the first flash the index is released and starts to rotate. The second flash occurs when the echo impulse is received. The position of the index at this time indicates the altitude.

The use of the delay line is important in connection with such an indicating device since it is desirable that at all altitudes above the lowest altitude to be measured, or zero altitude, that the two periods when the lamp is lighted appear to the observer as distinct intervals in the same way as is true with respect to the audible indication.

It will of course be understood that while I have shown but one means whereby the time delay in the indication of the echo impulses is produced, other means for producing this result will immediately occur to one skilled in the art. Electrical or electromechanical time delay means, of course, are well known and may be included in the circuit 6, the filter in that case being connected directly to the megaphone 2. Further, acoustical mechanical delay means may also be employed. I prefer, however, in the interest of economy, and to reduce the encumberment and burden to the craft, to utilize an acoustic delay device such as that described and illustrated.

While I have shown a particular embodiment of my invention it will of course be understood that I do not wish to be limited thereto since different modifications may be made, and I contemplate by the appended claims to cover any such modifications as fall within the true spirit and scope of my invention.

What I claim as new and desire to secure by Letters Patent of the United States, is:

1. In a system for indicating altitudes from aircraft wherein sound wave impulses are transmitted from the craft toward the earth and the time interval between the instant of transmission of any impulse and reception thereof due to reflection from the earth is utilized to determine the altitude, the method which comprises artificially increasing said time interval to such an extent that when the craft is at any altitude greater than the altitude at which the operator executes his final landing operation reception of the reflected impulse appears to occur subsequent to transmission of the respective impulse from the craft.

2. In a system for indicating altitudes from aircraft wherein sound wave impulses are transmitted from the craft toward the earth and the time interval between the instant of transmission of any impulse and reception thereof due to reflection from the earth is utilized to determine the altitude, the method which comprises producing an indication to the operator in response to the transmitted impulse and in response to reception thereof and delaying the latter indication relative to the first efficiently to cause said indications to appear to the operator to occur successively at all altitudes in excess of the altitude at which the operator executes his final landing operation.

3. In a system for indicating altitudes from aircraft wherein sound wave impulses are transmitted from the craft toward the earth and the time interval between the instant of transmission of any impulse and reception thereof due to reflection from the earth is utilized to determine the altitude, the method which comprises producing a sound indication at the ear of the operator in response to the transmitted impulse and in response to reception thereof and delaying the latter produced indication relative to the first produced indication by such an amount that said indications appear to the operator to occur successively at all altitudes in excess of the altitude at which the operator executes his final landing operation and to appear to blend at substantially zero altitude.

4. The combination, in an altimeter for aircraft of a sound wave transmitter and a sound wave receiver arranged on the aircraft, a sound wave indicating device, means whereby an indication is produced by said device substantially simultaneously with the transmission of a sound wave impulse by said transmitter, means whereby an indication is produced by said device subsequent by a predetermined time interval to reception of a sound wave impulse in said receiver, whereby when the craft is at zero altitude said indicating device is operated in response to the received impulse subsequent to operation thereof in response to transmission of the same impulse.

5. The combination in an altimeter for aircraft, of a sound wave transmitter and a sound wave receiver arranged on the craft, a sound wave indicating device, means electrically to transmit sound from said sound wave transmitter to said indicating device whereby an indication of sound waves transmitted by said transmitter is produced in said indicating device substantially simultaneously with the transmission of said sound waves, and means to transmit sound waves from said receiver to said sound wave indicating device, said means comprising means to delay the transmission of said sound waves by an adjustable amount.

6. The combination, in an altitude indicating device for aircraft, of a sound impulse transmitter and a sound receiver arranged on the craft, an audible sound indicator, an electric sound wave pick-up located in proximity to said transmitter, said pick-up being electrically connected to said sound indicator, means to operate said audible indicator in response to sound received in said receiver, said means comprising an acoustic channel through which received waves are transmitted, said acoustic channel having a length such that when the craft approaches the earth distinct indications are heard from said audible indicator for each transmitted impulse and its echo until the craft is sufficiently near the earth to enable the operator to execute his final landing operation.

7. The combination, in an echo apparatus, of means to transmit sound wave impulses, means to receive said impulses after reflection from a distant surface, means to produce two distinct light flashes for each transmitted impulse one occurring upon transmission of the impulse and the other occurring in response to reception of the impulse, and means whereby said light flashes appear as distinct flashes when the reflecting surface is at substantially zero distance from said apparatus.

CHESTER W. RICE.